(12) United States Patent
Shang (10) Patent No.: US 10,880,367 B2
(45) Date of Patent: Dec. 29, 2020

(54) LOAD BALANCING STRETCHED CLUSTERS IN A DISTRIBUTED NETWORK

(71) Applicant: VMWARE, INC., Palo Alto, CA (US)

(72) Inventor: Jingliang Shang, Beijing (CN)

(73) Assignee: VMWARE, INC., Palo Alto, CA (US)

( * ) Notice: Subject to any disclaimer, the term of this patent is extended or adjusted under 35 U.S.C. 154(b) by 0 days.

(21) Appl. No.: 16/351,460

(22) Filed: Mar. 12, 2019

(65) Prior Publication Data
US 2020/0236159 A1 Jul. 23, 2020

(30) Foreign Application Priority Data

Jan. 23, 2019 (WO) ................ PCT/CN2019/072784

(51) Int. Cl.
*H04L 29/08* (2006.01)
*H04L 12/24* (2006.01)
*G06F 9/455* (2018.01)

(52) U.S. Cl.
CPC ........ *H04L 67/101* (2013.01); *G06F 9/45558* (2013.01); *H04L 41/0806* (2013.01); *G06F 2009/4557* (2013.01); *G06F 2009/45595* (2013.01)

(58) Field of Classification Search
CPC ............... H04L 67/101; H04L 41/0806; G06F 9/45558; G06F 2009/4557; G06F 2009/45595
See application file for complete search history.

(56) References Cited

U.S. PATENT DOCUMENTS

2008/0189468 A1* 8/2008 Schmidt .............. G06F 11/2046
711/6
2018/0307512 A1* 10/2018 Balma ..................... G06F 9/505

OTHER PUBLICATIONS

Over technical documentation "VMware vSphere Metro Storage Cluster Recommended Practices" (May 2016) to VMware ("VMware") (Year: 2016).*

* cited by examiner

*Primary Examiner* — June Y Sison
(74) *Attorney, Agent, or Firm* — Clayton, McKay & Bailey, PC (57) ABSTRACT

A balancer can balance workloads in an active-active or active-passive stretched cluster by determining where to provision active instances of virtual machines. The balancer can maintain a set of compatibility rules to govern which hosts, such as sites or servers, are compatible with which instances. The compatibility rules can ensure that the same host does not run both instances, for failover purposes. Additionally, the balancer can create a key-value map that tracks performance of various available hosts. By monitoring host performance and maintaining the compatibility rules, the balancer can re-provision instances on different compatible hosts when performance of a current host suffers.

20 Claims, 6 Drawing Sheets

| Key(Peer) | Value(Data amount) |
|---|---|
| Peer1 (Local site) | X Bytes |
| Peer2 (Palo Alto) | Y Bytes |
| Peer3 (Los Angeles) | Z Bytes |
| Peer4 (aws.amazon.com) | A Bytes |
| Peer5 (cloud.google.com) | B Bytes |
| ...... | ...... |
| PeerN (www.vmware.com) | M Bytes |

LOAD BALANCING STRETCHED CLUSTERS IN A DISTRIBUTED NETWORK

CROSS REFERENCE TO RELATED APPLICATION

This patent application claims priority to PCT Application No. PCT/CN2019/072784 ("LOAD BALANCING STRETCHED CLUSTERS IN A DISTRIBUTED NETWORK"), filed in China on Jan. 23, 2019, which is hereby incorporated by reference in its entirety.

BACKGROUND

The rapid growth of public cloud infrastructure, such as 5G, and global software-defined data centers ("SDDC") promises higher network availability than prior solutions, which relied on localized clusters of servers. For example, applications running in the cloud can failover to another location if power failure occurs at one cluster. High availability ("HA") is an automated failover solution that has typically been confined to a single datacenter. For example, if a virtual machine ("VM") fails on one host device, the HA solution may restart the VM on another host device.

A stretched cluster can expand on the functionality of a traditional cluster by enabling devices within multiple locations (e.g., sites) to be part of the cluster. In general, a stretched cluster can include two or more virtualization host servers as part of the same logical cluster but located in separate geographical locations. For example, disk writes can be committed synchronously at two compute node locations to ensure that data is consistent, regardless of the location from which the data is being read. In some cases, a synchronous replica is maintained in a different availability zone ("AZ"), with multi-AZ clusters being supported by a load balancer.

However, load balancing a stretched cluster presents new challenges. Load balancers often do not differentiate a stretched cluster from a regular cluster, introducing problems when a node is remotely located from the load balancer. One issue is that traditional load balancers do not intelligently determine which AZ to use as the host servers for a virtualized workload. This problem exists for the two most commonly used HA cluster configurations, active-active ("A/A") and active-passive ("A/P"). In an A/P cluster, not all of the nodes are active. A passive node serves as a failover backup that can take over if the active node gets disconnected or has some other problem. In an A/A cluster, multiple active nodes are configured nearly identically, with duplicate instances of the workload. These nodes stay active and can be used for immediate failover, providing higher availability than A/P. The nodes actively run the same kind of service simultaneously. A client connecting to the service can connect to the load balancer, such as VMware®'s vSphere®, which then connects the client to the service at one of the active nodes.

In an A/A stretched cluster, a dilemma arises regarding where the multiple active instances of the workload should be provisioned. Active nodes remote from the client can have different performance characteristics than those that are nearby, yet provide failover advantages such as not being impacted by the same power outage. Similar problems exist for A/P stretched clusters. Currently, applications are placed in any of the cluster nodes without necessarily considering performance and relative location with respect to the other active instance of the workload.

As a result, a need exists for load balancing a workload in a stretched cluster.

SUMMARY

Examples described herein include systems and methods that balance a workload on an A/A or A/P stretched cluster. A balancer can execute as part of a virtual management server. The balancer can ensure that active instances of the workload run in separate hosts of the stretched cluster. A host can be a physical server or a site within the stretched cluster. The workload can be one or more VMs.

In one example, the balancer provisions a first instance of the VM on a first host. The balancer can provision a second instance of the VM on a second host. The first and second hosts can be separate sites or compute nodes, in an example.

The balancer can also create and maintain a set of compatibility rules for determining which instances are compatible with which hosts. The compatibility rules can specify, for each instance, which hosts are available if the balancer needs to switch to another host. In one example, the compatibility rules can prevent the two active instances from being provisioned on the same host. For example, switching the first instance to a new host can include creating a third instance of the VM at the new host. The compatibility rules can prevent running the third instance on the same host as the second instance. For an A/P stretched cluster, switching can include creating a passive third instance and then activating it.

In one example, the balancer can switch the first instance to a third host based on the compatibility rules and performance data. The performance data can indicate the first instance will have a performance advantage at the third host compared to another of the hosts. To do this, the balancer can create a key-value map for the VM that includes host sites as keys and data transmission data amounts as values. The key-value map can be a set of relationships between sites and data transmission amounts for the VM at those sites over a time period. The balancer can rank these sites based on the data transmission amounts. For example, the balancer can order the key-value map based on the transmission data amounts, the top-ranked host site being the one that exchanges the most data with the VM. Using the performance rankings, the balancer can determine the highest-ranked host that is also compatible with the instance being switched. For example, the sites can be related to the compatible hosts.

The compatibility rules can be group-based, in an example, such that each instance runs on hosts within one of multiple groups. Alternatively, the compatibility rules can track which hosts are compatible for which instances without relying on groups. For example, a set of compatibility rules can include a first rule indicating the first instance is compatible with the first host, a third host, and a fourth host, but not the second host. A second rule can indicate the second instance is compatible with the second host, the third host, and the fourth host, but not the first host.

In one example, when the first host falls below a performance threshold, the balancer can switch the first instance to the third host based on the first instance being incompatible with the second host and the first instance having more data transmissions to the third host than the fourth host. Switching can include stopping execution of the first instance of the VM and instantiating a third instance of the VM on the third host. A hypervisor on the third host can instantiate the third instance at the request of the balancer.

Both the foregoing general description and the following detailed description are exemplary and explanatory only and are not restrictive of the examples, as claimed.

DESCRIPTION OF THE EXAMPLES

Reference will now be made in detail to the present examples, including examples illustrated in the accompanying drawings. Wherever possible, the same reference numbers will be used throughout the drawings to refer to the same or like parts.

In one example, a balancer process determines where to provision first and second instances of a VM in an A/A or A/P stretched cluster. A stretched cluster can be a collection of network resources that are distributed in different geographic locations, such as over a wide area network ("WAN"). The stretched cluster can be a multi-AS cluster or a metro cluster, in an example. It can function as an HA cluster, with the balancer providing failover functionality. The stretched cluster can include at least two hosts in different locations. A host can be considered a site, with one or more servers capable of running instances of VMs. Although many examples refer to first and second instances of the VM, any number of multiple instances can be used. In an A/A example, the first and second instances are active. In an A/P example, the first instance can be active while the second instance is passive.

The balancer can execute on a virtual management server that receives requests from user devices accessing a VM. The balancer can keep at least the first and second instances active on hosts within the stretched cluster. To do this, the balancer can maintain a set of compatibility rules to govern which hosts are compatible with which instances. The compatibility rules can ensure that the same host does not run both instances, for failover purposes. Additionally, the balancer can create a key-value map that tracks performance of various available hosts. By monitoring host performance and maintaining the compatibility rules, the balancer can re-provision the instances on different compatible hosts when performance of a current host suffers.

Figure 1:
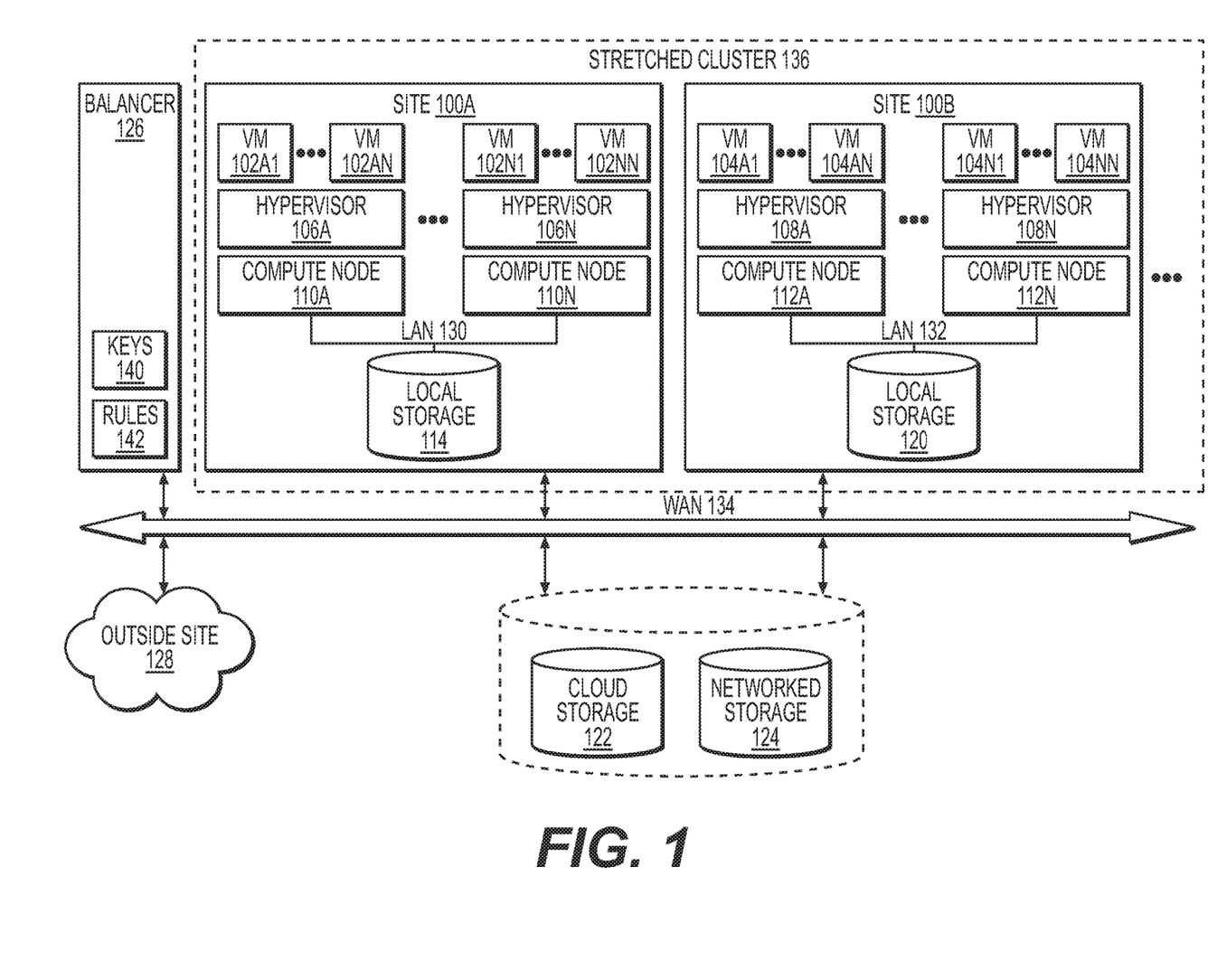
FIG. 1 is an example system diagram including system components used for balancing a stretched cluster.

FIG. 1 is an example illustration of a stretched cluster 136. The stretched cluster 136 can include multiple host sites, including a first site 100A and second site 100B. Both sites 100A and 100B can include compute nodes 110A-N, 112A-N, respectively. Compute nodes 110A-N, 112A-N can be hosts, and include physical computing devices, such as physical servers with physical processors. The compute nodes can provide physical hardware upon which virtualized components can operate, such as VMs 102A1-AN and 102N1-NN. Each compute node 110A-N can include a hypervisor 106A-N for running and managing multiple VMs 102A1-AN, 102N1-NN, 104A1-AN, 104N1-NN. Each site 100A, 100B can also have local storage 114, 120. The local storage 114 can be a non-transitory, computer-readable storage medium accessible by multiple compute nodes 110A-N, for example, over a local area network ("LAN"). Although FIG. 1 only includes two sites 100A, 100B, a stretched cluster 136 can include many more sites in some examples. In one example, the sites 100A, 100B can access shared cloud storage 122 and networked storage 124 over a WAN 134. These can be physical servers running virtual applications for data access by the sites 100A, 100B, in an example.

A balancer 126 can execute on a virtual management server, which can be one or more physical servers with one or more processors. The balancer 126 can perform load balancing tasks for the stretched cluster 136. This can include determining which hosts should receive first and second instances of a VM. In one example, the hosts are sites 100A, 100B. In another example, the hosts are compute nodes 110A-N, 112A-N. Hosts can be one or more servers and can represent a whole cluster or part of a cluster. Hosts can also be virtualized but running on a physical machine.

In an A/A stretched cluster 136, the balancer 126 can provision at least two active instances of the VM on separate hosts 100A, 100B. The balancer 126 attempts to keep the two instances of the VM active for failover purposes. The balancer 126 can also ensure that these instances are located at different hosts, such as at two sites 100A, 100B that are located in different geographic locations. This can be advantageous if one site 100A experiences a power outage. If selecting different sites 100A, 100B is not possible, the balancer 136 can select two hosts at the same site 100A, but the hosts can be different compute nodes 110A, 110N. For example, one active instance 102A1 can run on compute node 110A while a second active instance 102NN (or passive instance for A/P examples) can run on compute node 110N. This can ensure that if compute node 110A, such as a server, goes down, the other compute node 110N is still running active instance 102NN. However, in a stretched cluster 136, the balancer 126 can attempt to select two different sites 100A, 100B as hosts to avoid placing both VM instances in one location for failover purposes. In this illustration, a first instance of the VM can be indicated by the VM 102A1 running on a hypervisor 106A at the first site 100A. A second instance of the VM can be provisioned on 104AN at the second site 100B, for example. A VM can be one type of workload that is balanced by the balancer 126.

In another example, the balancer 126 allows an administrator to create rules 142 using a console, including a GUI. As will be explained in more detail with regard to FIGS. 5A-5B, an administrator can create a rule that assigns a workload (e.g., VM) to groups. Each group can have multiple hosts (e.g., sites or servers within those sites). The groups can be geographically separate, as detected or known by the balancer 126. For some rule types, such as anti-affinity rules, the workload will run across each group by provisioning one instance to at least two groups. One instance will be placed in a first host of group one, and another instance will be placed in a second host of group two.

The compatibility rules 142 can be stored on a server where the load balancer 126 executes, in an example. Alternatively, the compatibility rules 142 can be stored in cloud storage 122 or networked storage 124. This can allow other processes to access and manipulate the rules 142, in an example.

The balancer 126 can also decide which sites 100A, 100B (e.g., hosts) will run the instances of the workload (e.g., VM) based on a key-value map 140 and compatibility rules 142. The compatibility rules 142 can be created by the balancer 126 and modified based on the current locations of the first and second instances of the VM. In one example, the compatibility rules 142 are created in a matrix format with VM instances as one index and sites as another index. The balancer 126 can use the compatibility rules 142 to ensure that the first and second instances are provisioned at different sites 100A, 100B (e.g., hosts) for purposes of A/A load balancing.

As an example, when host sites A, B, and C (not pictured) are part of the stretched cluster 136, compatibility rules 142 can specify which of these sites A, B, C can run the first and second instances of the VM. In this example, the first instance can initially run at site A and the second instance can initially run at site B. The balancer can choose this initial arrangement based on sites A and B being less utilized than site C, in an example. The balancer 142 can create compatibility rules 142 based on this arrangement. A first rule can specify the first instance is compatible with sites A and C, but not B. A second rule can indicate that the second instance is compatible with sites B and C, but not A. These rules can ensure that if either site A or B fails, the respective instance will not be provisioned at the same site where the other instance is already active.

For example, if site A goes down, the balancer 126 can create a third instance of the VM on site C. The balancer 126 can delete the rule for the first instance, which is no longer active. The balancer 126 can change the rule for the second instance to now be only compatible with B (but not C). And a new rule can be added for the third instance, which is only compatible with C (but not B).

The key-value map 140 can track performance data for the different sites 100A, 100B. The balancer 126 can use the key-value map 140 in conjunction with the compatibility rules 142 to determine where to place a new instance of the VM. The balancer can build the key-value map 140 based on which sites 100A, 100B are part of the stretched cluster 136. Then the balancer 126 can receive performance data from those sites 100A, 100B and store the sites and performance data as key-value pairs in the key-value map 140. As will be discussed with regard to FIG. 4, the key-value map 140 can record the sites with the most data transmissions with the workload (VM instances). In one example, the key-value map 140 includes an entry for each site based on its performance relative to the VM. In another example, only the top N number of sites are included.

The balancer 126 can switch an active instance of the VM to a better site according to the key-value map 140. This can help ensure that each instance of the VM operates at the site 100A, 100B where it will perform the best. In one example, the balancer 126 can also use the compatibility rules 142 to ensure that the site is compatible with the instance prior to provisioning. The balancer can choose the host site 100A, 100B that is the highest ranked in the key-value map 140 and also compatible for the instance of the VM according to the compatibility rules 142. Compatibility can be determined by treating the site as the host or by comparing host servers that are part of the site to the compatibility rules, depending on the example.

In one example, the key-value map 140 can track performance based on a value for data transmission total. The performance data can be based on network input and output ("I/O") to and from the workload. The performance data can be relative to the VM, such as total data transmissions between the VM and the site. The values can be total bytes, in one example. The key-value map 140 can track any host metric and can be used by the balancer 126 to determine which hosts are most idle, have the most available resources, or have the most specific capabilities needed for the workload. The key-value map 140 can be stored locally at the server hosting the balancer 126, or at a remote location such as networked storage 124.

The key-value map 140 can also include outside sites, such as outside side 128 in an example. If one of the top N sites in terms of data transmissions with the instance is an outside side 128, it can be in the list. If the highest ranked and compatible site is outside site 128, the balancer can choose a host (e.g., site 100A, 100B) based on the outside site 128. This can include choosing the closest host to the outside site 128 or choosing the host with the best performance metrics with the outside site 128.

The balancer 126 can switch the first or second instance based on a site failure or based on a periodic switch recommendation. The periodic switch can be checked based on an elapsed time period, in an example. In another example, if a current host is performing a threshold amount worse than another compatible host in the key-value map 140, the balancer 126 can make a switch.

For a switch recommendation based on the key-value map 140, the balancer 126 can keep an instance where it currently resides if the most data transmission for that instance is local (to the existing site). If more data transmission is occurring at a different compatible site, the balancer 126 can move the instance to that site. Technically, this can include instantiating a new instance of the VM at the new site and stopping the prior instance. Finally, if more data transmission is at an outside site 128, the balancer 126 can move the instance to the compatible site with the best connectivity to the outside site 128.

Figure 2:
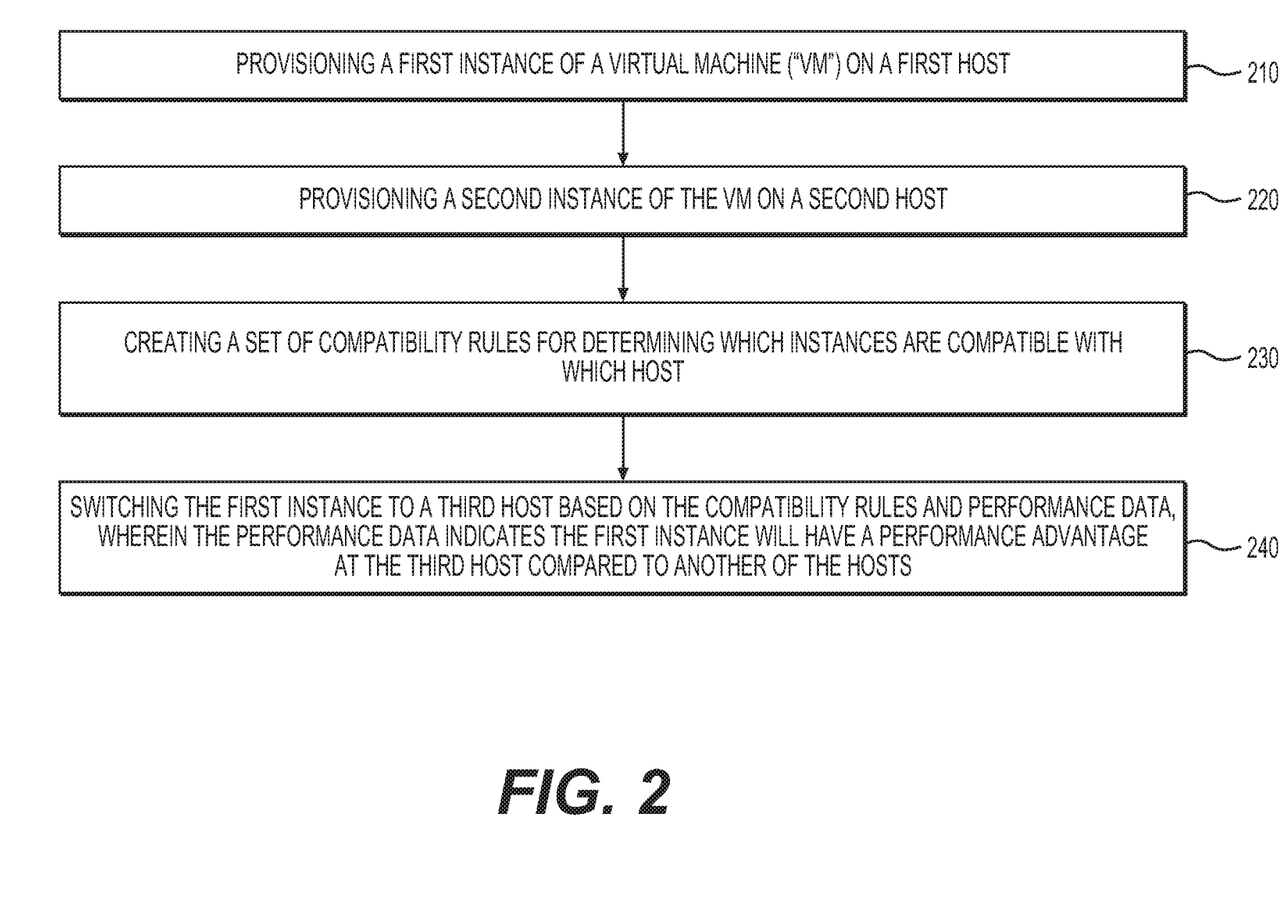
FIG. 2 is a flowchart of example stages for load balancing a stretched cluster.

FIG. 2 is an illustration of example stages that can be performed by the system. At stage 210, the balancer 126 can provision a first instance of a VM on a first host, such as site A or a physical server at site A. This can include utilizing a virtual layer infrastructure to communicate with a hypervisor at the host, in an example. The hypervisor can instantiate the VM, creating the first instance. At stage 220, the balancer 126 can provision a second VM on a second host. The second host can be a different site than the first host.

The first and second hosts can be chosen based on which sites (or servers therein) in the stretched cluster are least active, in an example. The balancer 126 can receive performance data or load information from the sites, and choose sites with less data throughput, compute node 110A-N utilization, or some other metric. In some examples, host servers or sites are chosen based on which hosts are most idle, have the most available resources, or have the most specific capabilities needed for the workload.

At stage 230, the balancer 126 can create and maintain a set of compatibility rules 142 for determining which VM instances are compatible with which hosts. These can be created before stages 210 and 220 in an example. The compatibility rules 142 can ensure that the first and second instances of the VM are active at different hosts (e.g., sites or servers) from one another, in an example. When the first instance is switched to a different compatible host, the balancer 126 can update the compatibility rules 142 to ensure that the second instance is not compatible with the host where the new (third) instance is created. Similarly, if the second instance is switched, the compatibility rules can be updated for the other active instances.

In one example, creating the compatibility rules 142 can include using a GUI to specify rules for a workload, such as a VM. The GUI can include features for quickly mapping instances to different compatible hosts, while making one or more other hosts incompatible. One such feature can be groups. Each group can be assigned an instance. The hosts within each group can be deemed compatible for the corresponding VM instance, but incompatible for a VM instance of another group. In one example, the hosts within each group represent different physical servers. The groups can be automatically generated by the balancer 126 by sorting the servers based on geographic location, in an example. The geographic sort can be based on the internet protocol ("IP") address of each server, in an example.

At stage 240, the balancer 126 can switch the first instance to a third host based on the compatibility rules and the performance data. The compatibility rules can indicate that the third host is compatible with the first instance and has better performance metrics for the VM compared to other compatible hosts. In one example, the balancer 126 can start at the top-ranked host of the key-value map 140 and check it against the compatibility rules 142. The balancer 126 can continue checking the hosts of the key-value map 140 in ranked order until the checked host is also determined to be compatible.

The performance data can indicate the third host will give the first instance a performance advantage. This can be based on greater data I/O between the first instance and the third host compared to I/O between the first instance and another host. Other factors can also be considered by the balancer 126. For example, a workload can have particular resources that it needs for operation, such as a number of virtual computer processing units ("vCPUs"). Therefore, the balancer can track the number of vCPUs available at each host. If the number of vCPUs does not exceed the workload requirements, the balancer 126 can avoid provisioning an instance with that host. In one example, the performance data can indicate the surplus of vCPUs, allowing the balancer 126 to rank hosts accordingly. The balancer 126 can periodically poll the hosts for performance data and update the key-value map 140.

Switching an instance can include provisioning a new instance at the newly-selected host. For example, switching the first instance to the third host can include provisioning a third instance of the VM at the third host and stopping the first instance. The third instance can be an identical configuration of the VM compared to the first instance. In one example, the first instance and second instance are also identical, replicating states or information to one another so that they can both remain active and useful in a failover scenario. When the balancer 126 switches the instance of the VM, the balancer 126 can also update the compatibility rules to ensure that the first and third instances remain on separate hosts (e.g., sites).

In an A/P example, switching can include changing a passive instance to active. The balancer can maintain one active instance and one or more passive instances. The switching can be a hot-migration on the active instance for load-balancing. For example, the balancer can provision a new passive third instance, then activate it and deactivate the currently active first instance. Therefore, switching in an A/P stretched cluster can be similar to switching in an A/A stretched cluster (e.g., where a new active instance is provisioned and the old active instance removed). The term "switch" can apply to either A/P or A/A examples.

Figure 3:
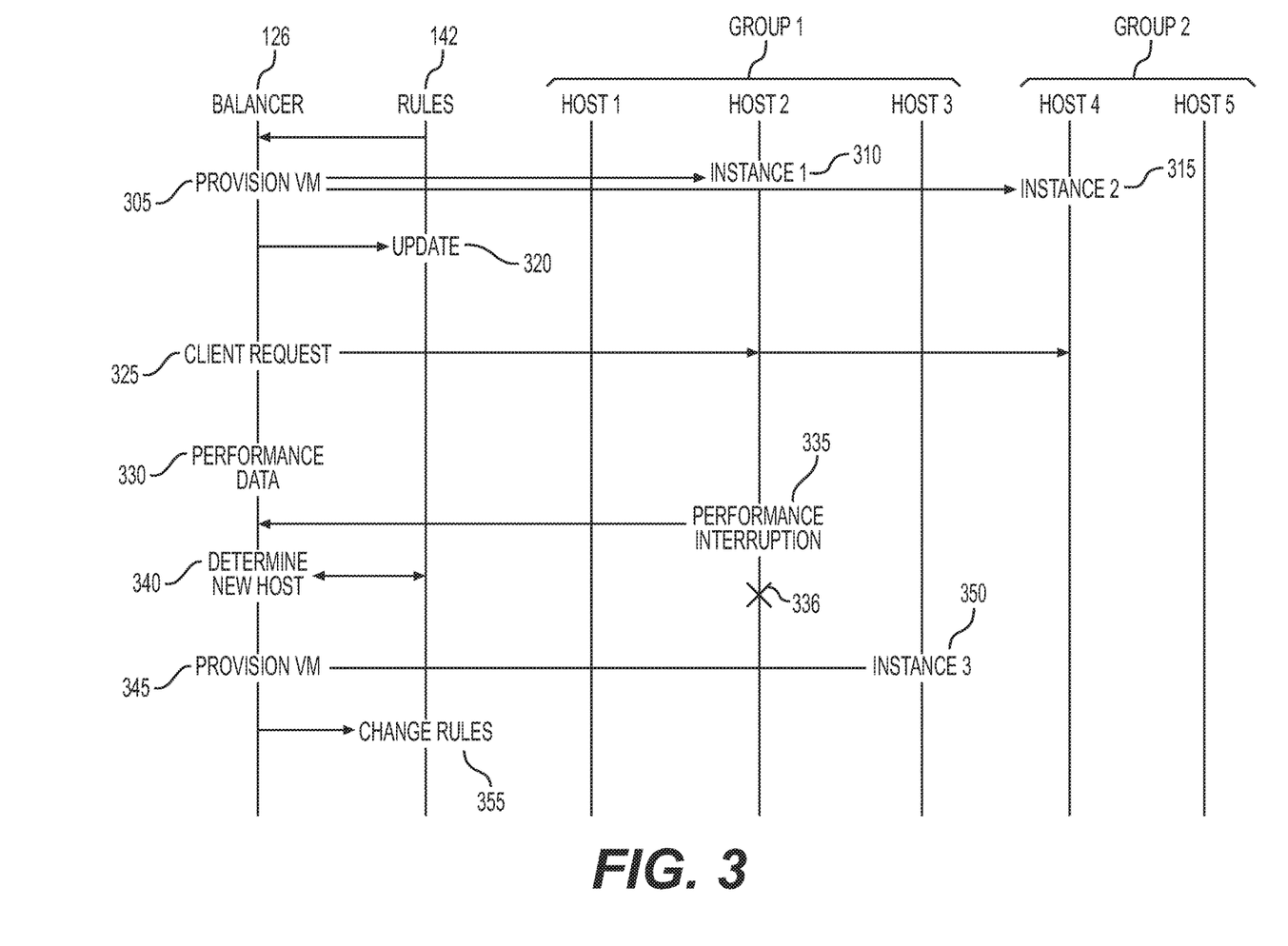
FIG. 3 is an example sequence diagram for load balancing a stretched cluster.

FIG. 3 is an example sequence diagram for balancing an A/A stretched cluster. The balancer 126 can provision a workload, such as a VM, at stage 305. The initial provisioning can be based on the compatibility rules 142, in an example. Additionally, the balancer 126 can select hosts based on which hosts meet performance requirements of the VM or have the most remaining compute capacity.

In this example, the rules 142 can separate hosts into first and second groups, Groups 1 and 2. Hosts 1, 2, and 3 can be associated with Group 1, whereas hosts 4 and 5 can be associated with Group 2. These hosts can be physical servers with IP addresses. The hosts of Group 1 can be located at one or more different sites than the hosts of Group 2. This can ensure that a VM instance on host 1, 2, or 3 will be at a different site than another VM instance on host 4 or 5.

As part of provisioning the workload in an A/A or A/P stretched cluster at stage 305, the balancer can provision the first instance of the VM to a host in Group 1 at stage 310. In this example, host 2 initially is provisioned with the first instance of the VM. The balancer 126 can choose host 2 over hosts 1 and 3 based on performance data, resource availability, or host 2 simply being more idle than hosts 1 and 3. To provision the first instance at stage 310, the balancer 126 can contact host 2. Host 2 can be executing a hypervisor 106A on a compute node 110A. The hypervisor 106A can manage VM instances that run on the compute node 110A of the host. In one example, at stage 310 the hypervisor 106A can start the first instance of the workload, such as VM 102A1. The first instance of the workload can include one or more instantiated VMs 102A1-102AN.

Provisioning the workload at stage 305 can further include provisioning a second instance at host 4. Host 4 can be part of a different site 100B than the site 100A of host 2. The hypervisor of host 4 can start the second instance at stage 315 based on communication from the balancer 126. In an A/A example, the second instance can be active. It can be passive in an A/P example.

At stage 320, the balancer 126 can update the compatibility rules 142 based on the placement of the active workload instances. Taking groups into account, instance 1 can be compatible with hosts 1-3 but not hosts 4 and 5. Instance 2 can be compatible with hosts 4- and 5, but not 1-3. If groups are not considered, then a first rule could make instance 1 compatible with hosts 1-3 and 5, but not 4. A second rule could make instance 2 compatible with hosts 1 and 3-5 but not 2. Rules can be created to this effect as part of stage 320.

At stage 325, the balancer 126 can receive a client request, such as from a user device attempting to interact with the workload. This can include, for example, a user device accessing an application that is running on one or more VMs. The balancer 126 can include virtual management functions of a server for receiving these requests and sending them to one or more of the active instances of the workload (e.g., VM). The balancer 126 tracks which instances of the VM are located at which hosts and can route the requests accordingly. In one example, a first request can be sent to the first instance and a second request can be sent to the second instance. The instances of the workload can synchronize information while both actively participating in handling requests from user devices, in an example. Alternatively, one instance can act as a primary request handler and the other instance can be updated to remain synchronized.

At stage 330, the balancer 126 can collect performance data from the hosts. The manner of collection can vary depending on what performance data is being collected. For example, if the performance data is response time, the balancer 126 can ping the hosts and measure the responses, or cause the instances to ping the hosts and make the measurements. If the performance data is I/O with the workload, the balancer 126 can receive this information from the instances.

The balancer 126 can use the performance data to update the key-value map 140, in an example. This can include ranking sites (also called "peers" or the key) based on the performance data values. This dynamically changing ranking can be used for provisioning new instances should a currently unused host (e.g., host 1, 3, or 5) outperform a host where an instance currently resides (e.g., host 2 or 4). In one example, the balancer 126 performs a periodic performance comparison, performing a switch when a threshold difference in performance between hosts exists.

Collecting performance data can also include assessing the health of the hosts. For example, if a host does not respond or responds to several requests in delayed fashion, the balancer 126 can identify a performance interruption at stage 335. In the example of FIG. 3, the balancer 126 identifies a performance interruption at host 2. This can be due to host 2 becoming nonresponsive or falling below a performance threshold. This can cause the balancer 126 to take steps towards switching the first instance to a new host—that is, provisioning a new instance of the VM to take over for the first instance. In one example, the balancer 126 sends a message to host 2 that the first instance is no longer needed at stage 336.

The balancer 126 can determine a new host for completing the switch at stage 340. This can include using both the key-value map 140 and the compatibility rules 142. The balancer 126 can rank potential hosts based on performance data in the key-value map 140. The key-value map 140 can be multi-dimensional, with more than one performance characteristic being tracked per host. The workload can have particular performance requirements that the balancer 126 uses to determine which ranking to utilize.

The balancer 126 can compare the ranked hosts against the compatibility rules to determine the new host. For example, if the ranked order is host 4, host 5, host 3, and host 1, then the balancer can select host 3 as the new host for completing the switch. This is because compatibility rules 142 can dictate that instance 1 is compatible with hosts 1-3 but not hosts 4 and 5. Therefore, host 3 is the top-ranked host that also satisfies the compatibility rules 142.

Therefore, at stage 345, the balancer 126 can provision a third instance of the workload (e.g., VM) at host 3. This can include contacting host 3 at stage 350, causing the hypervisor of that host to instantiate the third instance of the VM. The third instance can be provisioned as active in an A/A example. In an A/P example, the third instance can be provisioned as passive, then turned active once the first instance is deactivated.

To complete the switch, the balancer 126 can update the compatibility rules 142 at stage 355. This can include ensuring that the second instance is not compatible with host 3. In an example where groups are not enforced, this can include changing the second instance compatibility from hosts 1 and 3-5 to instead be hosts 1, 2, 4, and 5. However, if groups are enforced, then the rules can remain unchanged in this example.

Figure 4:
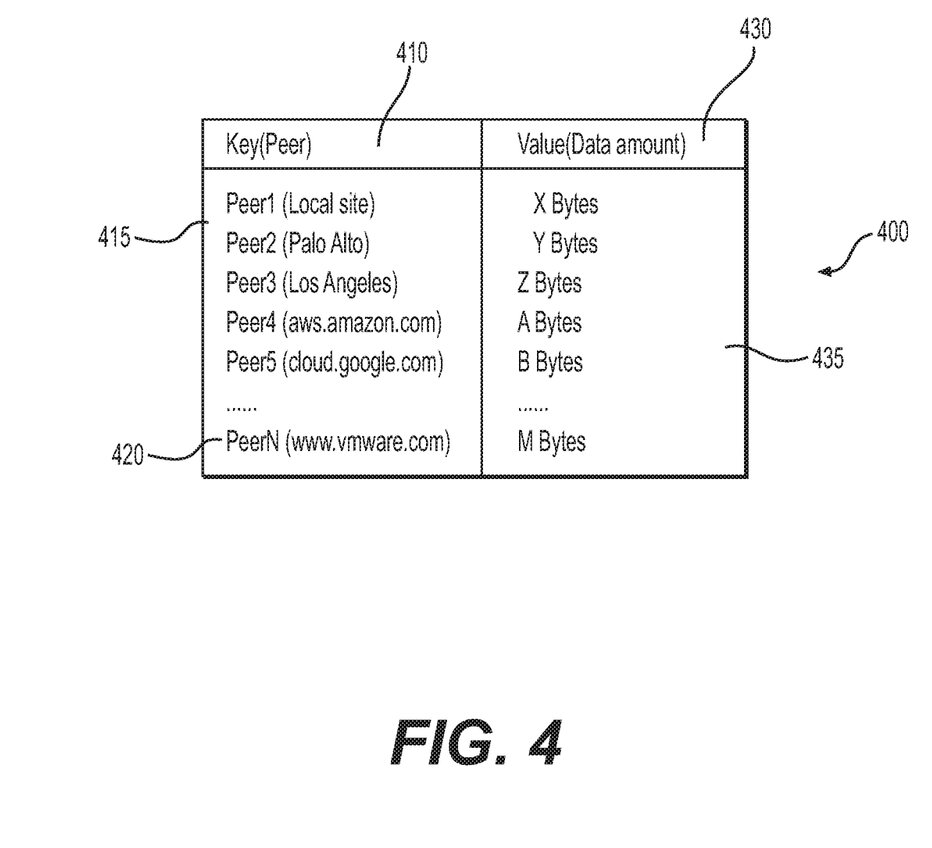
FIG. 4 is an example illustration of a key-value map for tracking performance data.

FIG. 4 is an example illustration of a key-value map 400 that maps peers 410, in this case sites 415, to performance values 430. In this example, the performance values 430 represent total I/O data amount between a workload (e.g., VM) and a site 415. The total I/O data amount can be represented in Bytes 435. The key-value map 400 can rank the sites 415 according to which ones have the most total I/O data with the workload. This can represent that the workload is accessing resources at the site 415, in an example.

The key-value map 400 can include sites 415 that are part of the stretched cluster 136. The sites 415 themselves can be hosts, or they can contain host servers. In one example, the key-value map 400 can also include sites 415 that are not within the stretched cluster 136 but are instead outside sites 128. In this example, Peer4, Peer5, and PeerN can all be outside sites. The key-value map 400 can be limited to some number N of total peers to keep storage and computational costs to a reasonable level. In this example PeerN 420 is the last site meeting the N number cutoff for the rankings. The rankings can be based on the performance values 435 such that X is greater than Y, which is greater than Z. The outside sites 128 can be weighted lower than sites 415 that are part of the stretched cluster 136, in an example. For example, the performance values A, B, and C can be determined by multiplying I/O amounts by a weight factor, such as 0.4. This can help the balancer 126 prioritize sites 415 where the workload can be directly instantiated to outside sites 128 where the balancer 126 can only instantiate the VM nearby. However, if Peer4 is the top-ranked compatible site, then the balancer 126 can poll other nearby sites 415 to determine which one operates most efficiently with Peer4. This nearby site 415 can be selected as the new host.

Figure 5A:
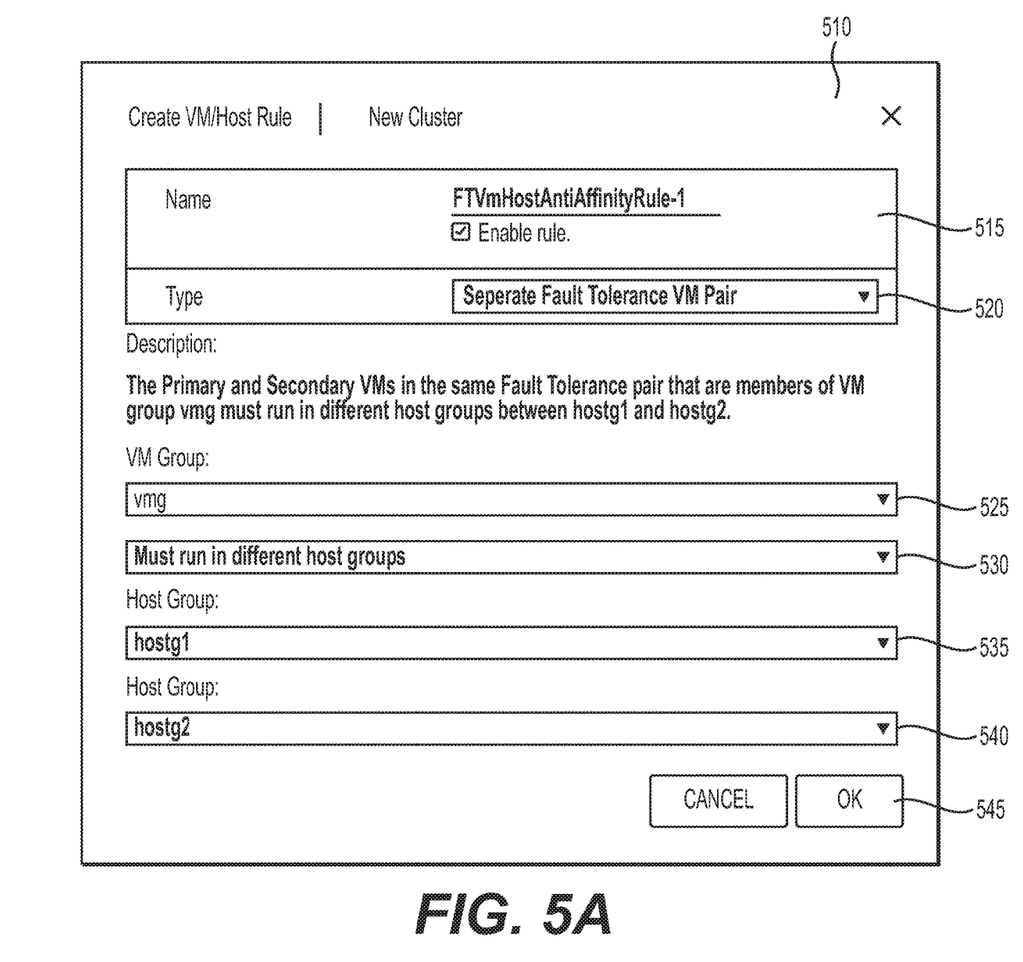
FIG. 5A is an example illustration of a graphical user interface ("GUI") for creating compatibility rules used in a stretched cluster.

FIG. 5A is an example illustration of a GUI screen 510 for creating compatibility rules 142 for a workload in a stretched cluster 136. A new ruleset can be created that has a name 515 and a type 520. The name 515 can help an administrator distinguish between different saved rulesets, which can be loaded and used for various workloads. The type 520 can determine how the rules 142 are used by the balancer 126. For example, a "separate fault tolerance" type can cause the balancer 126 to apply the rules to all active instances in an A/A stretched cluster 136.

One type of rule is an anti-affinity rule, in which instances are placed at different hosts or sites. Another type is an affinity rule, in which the first and second instances must be in the same group, host, or site. These types can be combined as an affinity/anti-affinity rule, where some workloads must be put together and others separated. Rules can be applied according to priority within the rules. Additionally, conflicting rules submitted by a user can be rejected before becoming part of the configuration rules.

In one example, the user can select a workload set 525 to which the rules 142 will apply. The workload set 525 can include one or more workloads, such as related VMs that should be treated with the same ruleset. A groups selection 530 can determine whether or not groups are applied to the rules 142. If groups are applied, then compatibility for each instance of the workload can be limited to that instance's respective group. In other words, the balancer 126 will ensure that the instances run in separate host groups rather than just separate hosts. This can ensure that the instances are placed in separate geographic locations, in an example. If groups are not applied, then the rules can be applied to keep the instances on different hosts.

In one example, the GUI provides options 535, 540 to select two host groups. Each host group can run one of the active instances. The host groups can be named based on the collection of host servers or sites available at those groups. The host servers can be organized into a host group based on geographic location or performance characteristics. Once the administrator has made these selections, they can select a button 545 to continue with the rule creation.

Figure 5B:
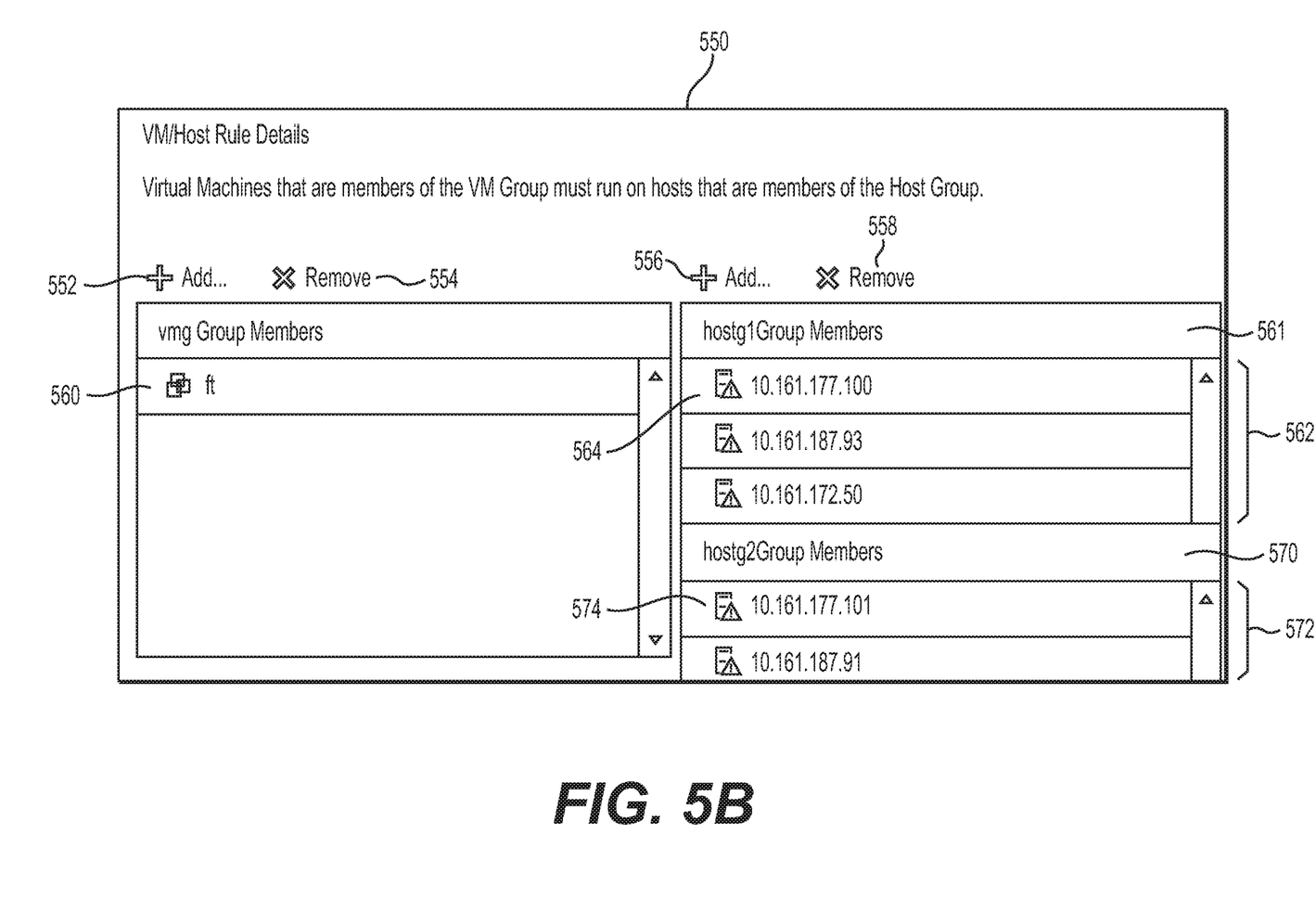
FIG. 5B is an example illustration of a GUI for created compatibility rules for a stretched cluster.

FIG. 5B is an example illustration of a GUI screen 550 showing compatibility rule details related to host groups selected with options 535, 540 in FIG. 5A. This screen 550 can include options for adding 552 and removing 554 workloads to the workload set 525. In this example, a workload 560 called "ft" has been added.

This workload is assigned to first and second groups of host servers. The first group 561 includes three host servers 562. The second group 570 includes two host servers 572. In one example, the GUI provides options for adding 556 or removing 558 host servers to and from the groups 561, 570. In one example, the groups 561, 570 can correspond to host sites, and the servers 562, 572 can correspond to host servers within those sites.

For the purposes of this disclosure, stretched clusters and multi-AZ clusters are referred to interchangeably. The examples are not meant to be limited to one or the other and instead apply to both. Additionally, the hosts can be the sites themselves or compute nodes (e.g., servers) within sites.

Other examples of the disclosure will be apparent to those skilled in the art from consideration of the specification and practice of the examples disclosed herein. Though some of the described methods have been presented as a series of steps, it should be appreciated that one or more steps can occur simultaneously, in an overlapping fashion, or in a different order. The order of steps presented are only illustrative of the possibilities and those steps can be executed or performed in any suitable fashion. Moreover, the various features of the examples described here are not mutually exclusive. Rather any feature of any example described here can be incorporated into any other suitable example. It is intended that the specification and examples be considered as illustrative only, with the true scope and spirit of the disclosure being indicated by the following claims.

What is claimed is:

1. A method for workload distribution in a stretched cluster spanning a distributed network, comprising:
    provisioning a first instance of a virtual machine ("VM") on a first host;
    provisioning a second instance of the VM on a second host;
    creating a set of compatibility rules for determining which instances are compatible with which hosts, wherein the compatibility rules include specifying different host groups for the first and second instances of the VM;
    creating a set of relationships between sites and data transmission amounts for the VM at those sites over a time period;
    ranking the sites for the VM based on the data transmission amounts; and
    switching the first instance to a third host based on the compatibility rules and performance data, wherein the performance data indicates the first instance will have a performance advantage at the third host compared to another of the hosts, and wherein the switching further includes:
        determining a highest ranked site where the second instance is not also present; and
        initiating the switch when the transmission amount for the determined highest ranked site is greater than the transmission amount for a local site that includes the first host.

2. The method of claim 1, wherein the hosts represent different availability zone clusters.

3. The method of claim 1, wherein creating the set of compatibility rules includes creating at least first and second groups of hosts, wherein the first instance is assigned compatibility to the first group and the second instance is assigned compatibility to the second group, and wherein the first instance is switched to the third host instead of a fourth host based on the third host being in the first group and the fourth host being in the second group.

4. The method of claim 1, wherein the performance data indicates that the first instance transmits more data to an outside site than any of the hosts, and wherein the third host is the closest host to the outside site.

5. The method of claim 1, wherein switching the first instance to the third host is based on a ranking of a site that includes the third host.

6. The method of claim 1, wherein the set of compatibility rules includes:
    a first rule indicating the first instance is compatible with the first host, a third host, and a fourth host, but not the second host; and
    a second rule indicating the second instance is compatible with the second host, the third host, and the fourth host, but not the first host;
    when the first host falls below a performance threshold, switching the first instance to the third host based on the first instance being incompatible with the second host and the first instance having more data transmissions to the third host than the fourth host.

7. The method of claim 1, wherein the compatibility rules prevent any two active instances of the VM from residing at the same host, including preventing a third instance of the VM from existing on the same host as the second instance.

8. A non-transitory, computer-readable medium comprising instructions that, when executed by a processor, perform stages for workload distribution a stretched cluster spanning a distributed network, the stages comprising:
    provisioning a first instance of a virtual machine ("VM") on a first host;
    provisioning a second instance of the VM on a second host;
    creating a set of compatibility rules for determining which instances are compatible with which hosts, wherein the compatibility rules include specifying different host groups for the first and second instances of the VM;
    creating a set of relationships between sites and data transmission amounts for the VM at those sites over a time period;
    ranking the sites for the VM based on the data transmission amounts; and
    switching the first instance to a third host based on the compatibility rules and performance data, wherein the performance data indicates the first instance will have a performance advantage at the third host compared to another of the hosts and wherein the switching further includes:
        determining a highest ranked site where the second instance is not also present; and
        initiating the switch when the transmission amount for the determined highest ranked site is greater than the transmission amount for a local site that includes the first host.

9. The non-transitory, computer-readable medium of claim 8, wherein the hosts represent different availability zone clusters.

10. The non-transitory, computer-readable medium of claim 8, wherein creating the set of compatibility rules includes creating at least first and second groups of hosts, wherein the first instance is assigned compatibility to the first group and the second instance is assigned compatibility to the second group, and wherein the first instance is switched to the third host instead of a fourth host based on the third host being in the first group and the fourth host being in the second group.

11. The non-transitory, computer-readable medium of claim 8, wherein the performance data indicates that the first instance transmits more data to an outside site than any of the hosts, and wherein the third host is the closest host to the outside site.

12. The non-transitory, computer-readable medium of claim 8,
wherein switching the first instance to the third host is based on a ranking of a site that includes the third host.

13. The non-transitory, computer-readable medium of claim 8, wherein the set of compatibility rules includes:
a first rule indicating the first instance is compatible with the first host, a third host, and a fourth host, but not the second host; and
a second rule indicating the second instance is compatible with the second host, the third host, and the fourth host, but not the first host;
when the first host falls below a performance threshold, switching the first instance to the third host based on the first instance being incompatible with the second host and the first instance having more data transmissions to the third host than the fourth host.

14. The non-transitory, computer-readable medium of claim 8, wherein the compatibility rules prevent any two active instances of the VM from residing at the same host, including preventing a third instance of the VM from existing on the same host as the second instance.

15. A system for workload distribution in an active-active ("A/A") distributed network, comprising:
a non-transitory, computer-readable medium containing instructions; and
a processor that executes the instructions to perform stages comprising:
provisioning a first instance of a virtual machine ("VM") on a first host;
provisioning a second instance of the VM on a second host;
creating a set of compatibility rules for determining which instances are compatible with which hosts, wherein the compatibility rules include specifying different host groups for the first and second instances of the VM:
creating a set of relationships between sites and data transmission amounts for the VM at those sites over a time period;
ranking the sites for the VM based on the data transmission amounts; and
switching the first instance to a third host based on the compatibility rules and performance data, wherein the performance data indicates the first instance will have a performance advantage at the third host compared to another of the hosts, and wherein the switching further includes:
determining a highest ranked site where the second instance is not also present; and
initiating the switch when the transmission amount for the determined highest ranked site is greater than the transmission amount for a local site that includes the first host.

16. The system of claim 15, wherein the hosts represent different availability zone clusters.

17. The system of claim 15, wherein creating the set of compatibility rules includes creating at least first and second groups of hosts, wherein the first instance is assigned compatibility to the first group and the second instance is assigned compatibility to the second group, and wherein the first instance is switched to the third host instead of a fourth host based on the third host being in the first group and the fourth host being in the second group.

18. The system of claim 15, wherein the performance data indicates that the first instance transmits more data to an outside site than any of the hosts, and wherein the third host is the closest host to the outside site.

19. The system of claim 15,
wherein switching the first instance to the third host is based on a ranking of a site that includes the third host.

20. The system of claim 15, wherein the compatibility rules prevent any two active instances of the VM from residing at the same host, including preventing a third instance of the VM from existing on the same host as the second instance.

* * * * *